Nov. 5, 1968
L. A. McCRACKEN
3,409,147
BALE TURNER ATTACHMENT
Filed March 7, 1966
2 Sheets-Sheet 1
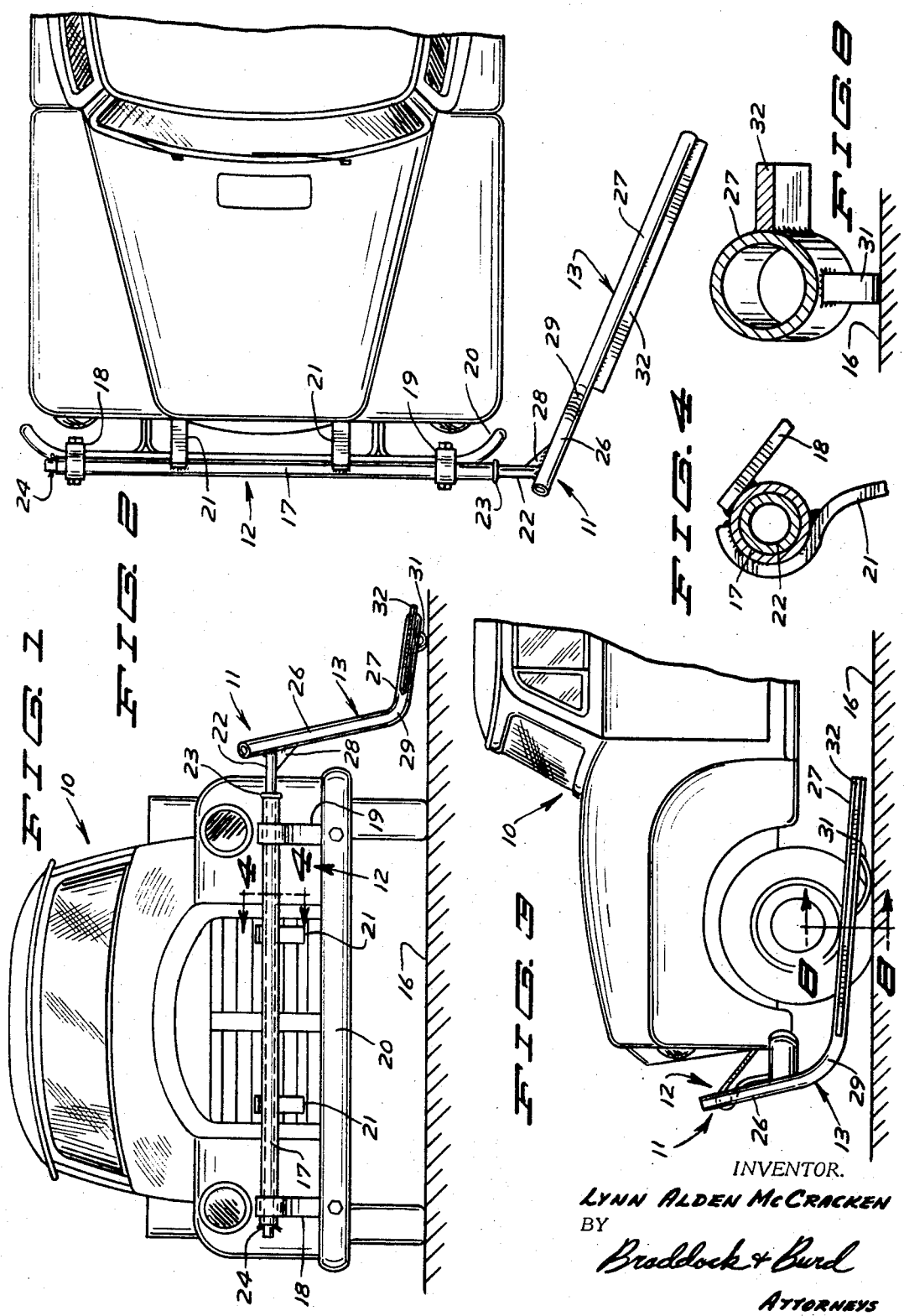
INVENTOR.
LYNN ALDEN McCRACKEN
BY
Braddock & Burd
ATTORNEYS Nov. 5, 1968
L. A. McCRACKEN
3,409,147
BALE TURNER ATTACHMENT
Filed March 7, 1966
2 Sheets-Sheet 2
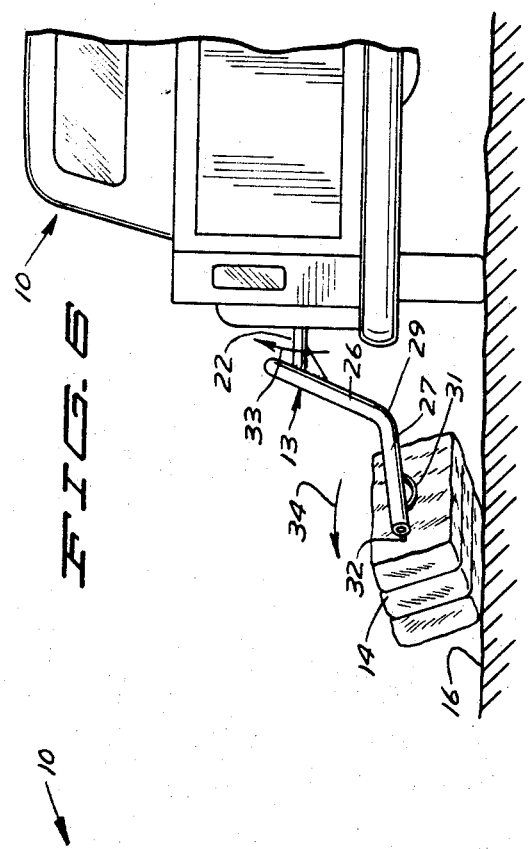
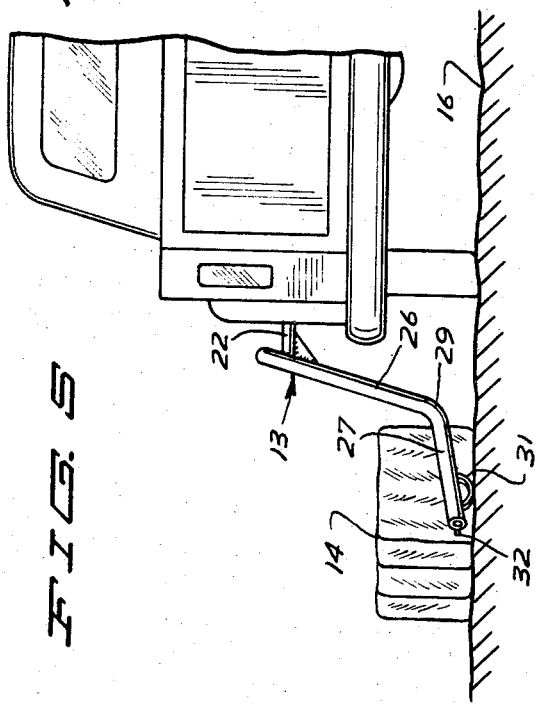
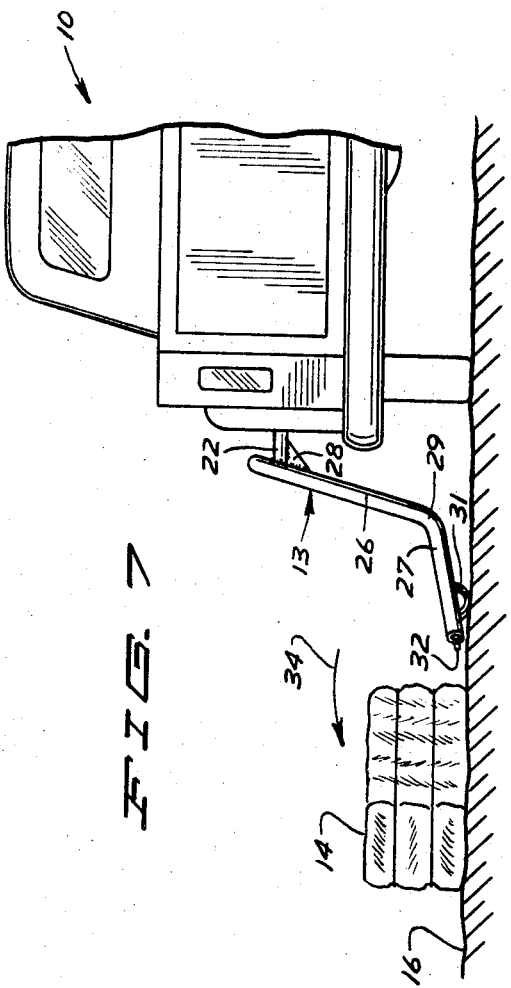
INVENTOR.
LYNN ALDEN McCRACKEN
BY
Braddock & Burd
ATTORNEYS

United States Patent Office 3,409,147
Patented Nov. 5, 1968

3,409,147
BALE TURNER ATTACHMENT
Lynn Alden McCracken, Box 703, Turner, Mont. 59542
Filed Mar. 7, 1966, Ser. No. 532,138
9 Claims. (Cl. 214—1)

ABSTRACT OF THE DISCLOSURE

A bale turner rotatably mounted on the front of a truck operable to roll bales lying on the ground. The turner has a rearwardly and an outwardly projected arm mounted for movement about an axis generally transverse to the forward movement of the truck. The arm has an outwardly projected longitudinal rib and is held above the ground by a downwardly curved skid.

---

This invention relates to an apparatus for turning an article lying on the ground and more particularly to an apparatus having an arm mountable on a vehicle which moves the arm into engagement with a bale whereupon the arm turns the bale.

Briefly described, the bale turning apparatus is carried by a vehicle, as a truck, tractor, trailer and the like, and moved by the vehicle into engagement with a bale lying on the ground to roll or turn the bale. The bales may be of any material as hay, straw, corn and the like, which is usually left lying on the ground in windrows or generally scattered after the material has been compressed into bales. These bales must be periodically turned to prevent deterioration of the material in contact with the ground. The bale turning apparatus has a rearwardly projected arm mounted for movement about an axis generally transverse to the forward movement of the vehicle. The arm has an outwardly and rearwardly projected section movable into engagement with a bale lying on the ground for forward movement of the vehicle. The rearward section of the arm moves in generally up and down directions. On engaging a bale the rearward section moves upwardly and turns the bale. After the arm leaves the turned bale it falls downwardly to a position to engage a second bale.

The arm is rotatably mounted on the vehicle with the use of a generally transverse rotatable member telescoped into a tubular member secured to the vehicle. The rotatable member can be readily removed from the tubular member enabling the arm to be quickly disconnected from the vehicle. This allows the vehicle to be used for other purposes.

In the drawing:

FIGURE 1 is a front elevational view of a vehicle equipped with the bale turning apparatus of this invention;

FIGURE 2 is a fragmentary top view of the vehicle in FIGURE 1 showing a plan view of the bale turning apparatus;

FIGURE 3 is a side elevational view of the vehicle and bale turning apparatus shown in FIGURES 1 and 2;

FIGURE 4 is an enlarged sectional view taken along the lines 4—4 of FIGURE 1;

FIGURE 5 is a rear elevational view of the bale turning apparatus mounted on a vehicle showing the position of the arm at the time when the arm initially strikes a bale;

FIGURE 6 is a view similar to FIGURE 5 showing the arm moving in an upward direction turning the bale;

FIGURE 7 is a view similar to FIGURE 5 showing the bale turned with the bale turning arm returned to a down position ready for engagement with another bale; and FIGURE 8 is an enlarged sectional view taken along the line 8—8 of FIGURE 3.

Referring to the drawings there is shown in FIGURES 1, 2 and 3, a vehicle 10 carrying the bale turning apparatus of this invention indicated generally at 11. Vehicle 10 shown as a pickup truck, can be other powered vehicles, as a tractor, and can be non-powered towed vehicles capable of being moved across a field as trailers, skids, and the like.

Bale turner apparatus 11 has a support 12 mounted on the front of vehicle 10. Projected laterally from support 12 is a rearwardly and outwardly directed arm indicated generally at 13. Arm 13 projects rearwardly and outwardly at an angle of approximately 25° with respect to the forward direction movement of vehicle 10. Arm 13 is pivotally mounted on support 12 for movement in up and down directions. In use as shown in FIGURES 5, 6 and 7, vehicle 10 is driven in a forward direction locating arm 13 in alignment with bale 14 so that the bale is bumped by the forward portion of arm 13. Bale 14 being a stationary object on the ground 16 forces the arm back and up. Movement of the arm upwardly forces the bale upwardly and laterally turning the bale with a roll motion.

Support 12 comprises a tubular member 17 transversely mounted across the front of vehicle 10 by a plurality of brackets 18, 19 and 21 secured to the frame of the vehicle. Brackets 18, 19 and 21 project in an upward direction transversely positioning tubular member 17 generally above vehicle bumper 20. Tubular member 17 is a combined support and bearing for an elongated cylindrical member 22 telescoped within tubular member 17 as shown in FIGURE 4. Member 22 is a second tubular member having an outside diameter slightly less than the inside diameter of tubular member 17. Cylindrical member 22 has opposite ends projected laterally from tubular member 17. The left end of member 22 as viewed in FIGURE 2 has a cylindrical collar 23 welded to member 22. Collar 23 functions as a stop to locate cylindrical member 22 in tubular member 17 with opposite or right end of member 22 projected from the end of tubular member 17. A suitable retaining means 24, as a removable washer and bolt or cotter pin, attached to the right or opposite end of member 22 limits outward movement of member 22 from tubular member 17. Retaining means 24 is readily removed from member 22 enabling cylindrical member 22 to be quickly removed from support 12. This permits the vehicle to be used for other purposes as support 12 does not project laterally of the vehicle body.

Elongated cylindrical member 22 in cooperation with tubular member 17 pivotally mounts arm 13 on the vehicle for movement about an axis generally transverse to the forward movement of the vehicle. Arm 13 comprises a first downwardly and outwardly directed section 26 and a second outwardly and rearwardly directed section 27. The upper end of first section 26 is secured to the outer end of cylindrical member 22. The connection between member 22 and section 26 is reinforced with a triangular gusset 28. First section 26 is integral with second section 27. These sections are attached with a rearwardly curved elbow portion or nose 29. The entire arm 13 is formed from a single piece of tubular material, as a pipe.

As shown in FIGURES 3 and 8, second arm section 27 slopes slightly downwardly and is supported above the surface of ground 16 by a downwardly curved skid 31 attached to a lower side of the rear end portion of the second arm section. To prevent slipping of second arm section 27 on the bale an elongated rib 32 projects laterally from section 27. Rib 32 extends from nose section 29 longitudinally along the outside of second section 27 to the end of section 27.

In use, tubular member 17 is secured to the front of the vehicle by upright brackets 18, 19 and 21. This structure comprises the support 12 for the movable arm 13. Cylindrical member 22 is telescoped into tubular member 17 to position arm 13 laterally of the left side of vehicle 10 where the arm may be viewed by the driver of the vehicle. To turn a bale, as bale 14 lying on ground 16, the vehicle is driven in a forward direction at speeds from 2 to 15 miles per hour. Vehicle 10 is driven along a line adjacent a row of bales to align arm 13 with the bales.

As shown in FIGURE 5, the bale 14 is initially bumped or contacted with the longitudinal rib 32 adjacent the bottom of the elbow or nose 29. Continued movement of vehicle 10 places rib 32 in longitudinal engagement with the upright side of bale 14. The resistance of the bale to movement forces arm 13 in an upward direction as indicated by arrow 33 in FIGURE 6. Arm 13 rotates cylindrical member 22 supported in tubular member 17. As arm 13 moves upwardly longitudinal rib 32 prevents the rear arm section 27 from slipping on the bale causing the bale to roll laterally as indicated by arrow 34 in FIGURE 7 one-quarter turn. As soon as arm 13 leaves the turned bale it falls downwardly until skid 31 rests on ground 16 positioning the arm for bumping a second bale.

A type of vehicle on which the bale turning apparatus 11 of this invention is mounted can be a self propelled vehicle, as a truck, car tractor or the like, or a towed vehicle, as a trailer, wheeled frame for mounting the support 12, bale elevators, bale loaders, and the like.

The invention is to be limited only by the scope of the following claims.

The embodiments of the invention in which an exclusion property on privilege is claimed as defined as follows:

1. An apparatus attachable to a movable vehicle for turning a bale lying on the ground comprising arm means for turning a bale, means for rotatably mounting said arm means on the vehicle for movement about an axis generally transverse to the forward movement of the vehicle, said arm means having a rearwardly directed bale engaging means movable into engagement with a bale lying on the ground on forward movement of the vehicle, said rearwardly directed means comprising an outwardly and rearwardly projected section, said rearwardly directed means on engaging a bale is moved upwardly by the bale, rotating the arm means about said transverse axis laterally turning the bale.

2. The apparatus defined in claim 1 wherein said means for rotatably mounting said arm means on the vehicle comprises an elongated tubular member securable to and extended transversely of the vehicle and an elongated rotatable member telescoped into said tubular member, said arm means secured to the rotatable member.

3. The apparatus defined in claim 2 wherein said arm means has a downwardly projected section having an upper portion secured to the rotatable member and a lower portion secured to the forward end of the means movable into engagement with the bale.

4. The apparatus defined in claim 1 wherein said arm means has a downwardly projected section secured to the forward end of the rearwardly directed means movable into engagement with the bale.

5. An apparatus attachable to a movable vehicle for turning a bale lying on the ground comprising: arm means for turning a bale, means for rotatably mounting said arm means on the vehicle about an axis generally transverse to the forward movement of the vehicle, said arm means having bale engaging means movable into engagement with a bale lying on the ground on forward movement of the vehicle, said bale engaging means including an outwardly and rearwardly projected section, and an outwardly projected rib secured to said rearwardly projected section.

6. The apparatus defined in claim 5 including means secured to said rearwardly projected section for holding said rearwardly projected section above the ground.

7. The apparatus defined in claim 6 wherein said means is a skid.

8. An apparatus attachable to a vehicle for turning a bale comprising: a movable arm, means for rotatably mounting said arm on the vhicle for movement about an axis generally transverse to the forward movement of the vehicle, said arm including a downwardly and outwardly projected first section having an upper portion secured to the means for rotatably mounting said arm on the vehicle, and a rearwardly and outwardly projected second section secured to the lower end of the first section movable into engagement with the bale lying on the ground on forward movement of the vehicle and an outwardly projected rib secured to said second section.

9. An apparatus defined in claim 8 including means secured to said rearwardly projected second section for holding said second section above the ground.

References Cited

UNITED STATES PATENTS

| | | | |
|---|---|---|---|
| 2,543,302 | 2/1951 | Rossiter. | |
| 2,634,003 | 4/1953 | Williamson et al. | 214—42 |
| 2,812,864 | 11/1957 | Martell | 214—1 |

FOREIGN PATENTS 885,481    12/1961    Great Britain.

ROBERT G. SHERIDAN, *Primary Examiner.*

F. E. WERNER, *Assistant Examiner.*